(No Model.)
T. J. CLEMENT.
COOKING UTENSIL.
No. 492,271.
Patented Feb. 21, 1893.
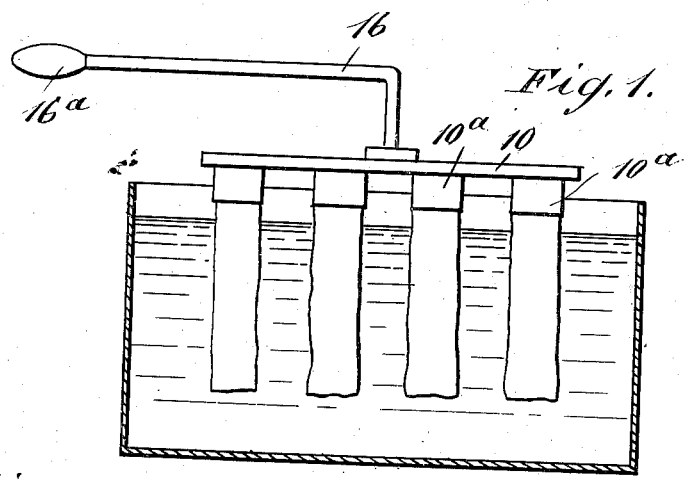
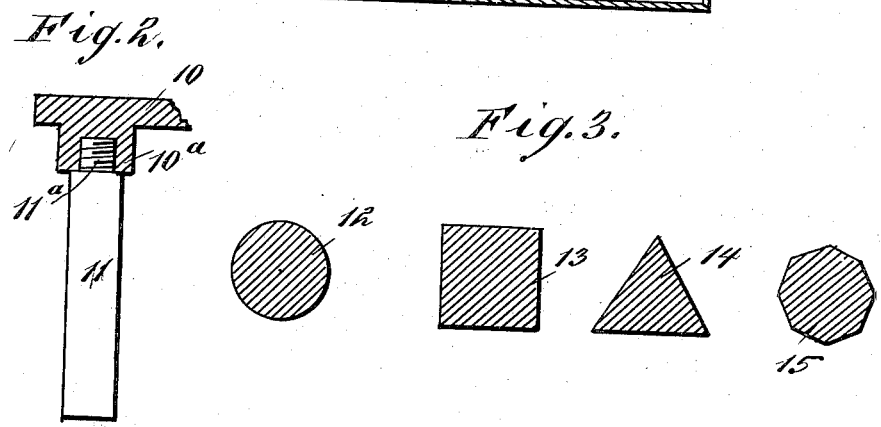
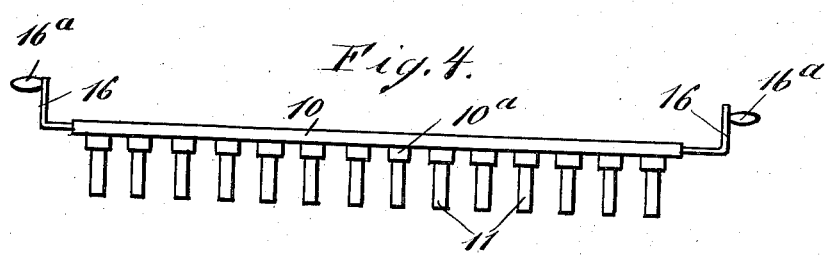
WITNESSES:
W. M. Twitchell
E. M. Clark
INVENTOR
T. J. Clement
BY
Munn & Co
ATTORNEYS.

UNITED STATES PATENT OFFICE.

TOMAS J. CLEMENT, OF NEW ORLEANS, LOUISIANA.

COOKING UTENSIL.

SPECIFICATION forming part of Letters Patent No. 492,271, dated February 21, 1893.

Application filed August 8, 1892. Serial No. 442,429. (No model.)

*To all whom it may concern:*

Be it known that I, TOMAS J. CLEMENT, of New Orleans, in the parish of Orleans and State of Louisiana, have invented a new and Improved Cooking Utensil, of which the following is a full, clear, and exact description.

My invention relates to cooking utensils such as are adapted for use in cooking doughnuts, crullers, waffles, or similar articles of food. It is well known that such articles are cooked quickly in hot grease, and that it is a difficult matter to have such articles cooked thoroughly in the inside.

The object of my invention is to produce a simple cooking utensil by means of which all said articles may be quickly and thoroughly cooked both inside and out, which is also adapted to enable the said articles to be easily and quickly handled, which is constructed in such a way that the cooked articles may be easily removed, and which is especially adapted to cook articles of the character described in such a way and of such shape that they may be advantageously filled with jelly, lemon cream, or similar edible substances.

To this end, my invention consists in a cooking utensil, the construction of which will be hereinafter described and claimed.

Reference is to be had to the accompanying drawings forming a part of this specification, in which similar figures of reference indicate corresponding parts in all the views.

Figure 1 is a side elevation of the utensil embodying my invention, showing its application to a box of grease; Fig. 2 is a detail sectional view, showing the manner in which the cooking fingers are secured to the body of the utensil; Fig. 3 is a sectional view showing in cross section several forms of fingers which may be used; and Fig. 4 is a side elevation of a slightly modified form of the invention.

The utensil is provided with a flat body 10, which on its under side is provided with lugs 10ª, and these are recessed vertically and screw-threaded so that the reduced and threaded upper ends 11ª of the depending fingers 11 may be screwed into them. This construction enables the fingers to be quickly and easily removed and others of different form substituted for them. These fingers 11 are adapted to be dipped in dough or batter and the batter which adheres to them will be cooked in a manner hereinafter described, and it will be understood that the fingers may be of any desired cross section so as to give the requisite shape to the cooked article. To illustrate this, several forms are shown in Fig. 3; one finger being of circular cross section, as shown at 12; another of rectangular cross section, as shown at 13; another of triangular cross section, as shown at 14; another of octagonal cross section as shown at 15, and any other desired shape may be given to the fingers. The body 10 is provided near the center and on the upper side with a bent rod 16, which terminates in a handle 16ª. As shown in Fig. 4, the body 10 is very much elongated, the fingers 11 are attached in the manner described and a handle is attached to each end of the body so as to enable it to be easily operated.

The utensil is used in the following way: A grease box 17 or other receptacle is filled with grease which is heated and kept at a temperature hot enough to fry doughnuts or similar articles, and the fingers 11 of the device are held in the grease until they become thoroughly heated, and they are then dipped into batter of a desired consistency and allowed to remain there for a sufficient time for the batter to adhere to them. The utensil is then raised and again placed in the hot grease and the batter which adheres to the fingers will be quickly and thoroughly fried. The iron is then removed from the grease box, and the fried articles are pushed from the fingers.

It will be seen that as the fingers are first heated thoroughly, the articles will be thoroughly fried on both the outside and inside, and as they are hollow, they may be easily filled with any desired edible compound.

Having thus described my invention, I claim as new and desire to secure by Letters Patent—

1. A cooking utensil, comprising a flat body provided with a handle projecting from its upper side and with a series of fingers depending from its lower side, substantially as described.

2. The herein described cooking utensil, consisting of the flat body portion 10, provided with the handle 16 16ª projecting from its upper side, and with detachable fingers depending from its lower side, substantially as specified.

TOMAS J. CLEMENT.

Witnesses:
CHAS. A. FISHER,
E. M. CLARK.